United States Patent [19]
Lingel et al.

[11] 3,727,180
[45] Apr. 10, 1973

[54] ON-BOARD AIRCRAFT WEIGHT AND C. G. SYNCHRO-TYPE SELF-CHECKING ATTITUDE SENSOR

[75] Inventors: Fred J. Lingel, Lynnfield; Alexander Filipov, Concord, both of Mass.

[73] Assignee: BLH Electronics, Inc., Waltham, Mass.

[22] Filed: Mar. 23, 1971

[21] Appl. No.: 127,226

[52] U.S. Cl. .............................340/27 AT, 33/215 C
[51] Int. Cl. .............................................G01c 19/32
[58] Field of Search..............340/27 AT; 33/215 C, 33/215 A, 220, 221, 204 R

[56] References Cited

UNITED STATES PATENTS

| | | | |
|---|---|---|---|
| 3,047,962 | 8/1962 | Jorgensen | 33/215 A |
| 3,241,245 | 3/1966 | Levine | 33/215 C |
| 2,436,417 | 2/1948 | Bogen | 33/215 C |
| 3,295,219 | 1/1967 | Stockton et al. | 33/215 C |

*Primary Examiner*—William C. Cooper
*Assistant Examiner*—Douglas W. Olms
*Attorney*—James E. Mrose and Mary C. Thomson

[57] ABSTRACT

In an on-board aircraft weight and c. g. system, compensation for effects of pitch or slope of the craft is provided by a synchro-type attitude sensor in which a relatively light weight, immersed in a damping fluid within close confines of a container, is suspended for limited fore-aft tilting about the axis of a precision-bearing synchro-rotor; the stator windings of the synchro include a normally-disabled winding having a close coupling with the rotor winding over the limited tilting range, and selective switching causes the normally disabled winding to yield an electrical output which serves as a test of electrical operating characteristics of the sensor.

5 Claims, 4 Drawing Figures

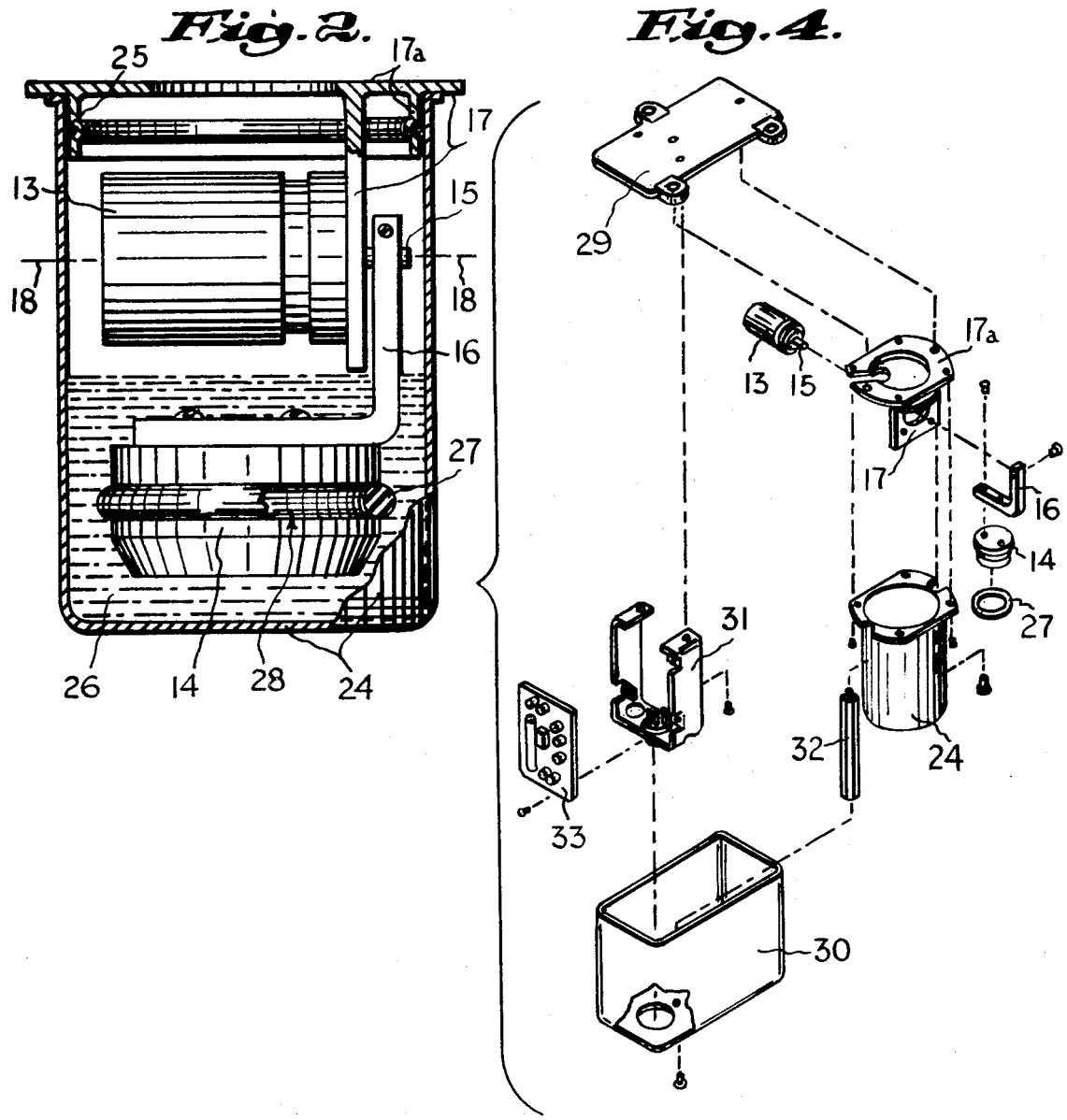

ON-BOARD AIRCRAFT WEIGHT AND C. G. SYNCHRO-TYPE SELF-CHECKING ATTITUDE SENSOR

BACKGROUND OF THE INVENTION

The present invention relates to improvements in attitude-corrected on-board weight-and-c. g. systems for aircraft, and, in one particular aspect, to novel and improved pitch-correction arrangements in which sensing of fore-aft angular deviations of a craft from the horizontal is uniquely and advantageously determined and self-checked by way of a miniature damped pendulous synchro-type inductor.

As has long been known, measurements of aircraft weights at distributed sites, such as those of the usual landing gear, provide data from which the total craft weight and the locus of its critical center of gravity may readily be calculated, as important aids to safe and efficient aircraft operation. These individual weights are advantageously measured "on-board," by way of sensors installed in the aircraft; in one such arrangement, for example, the sensors may be associated with and responsive to certain weight-related deformations exhibited by the axles through which the wheels support the grounded craft. Shear-responsive strain-gage transducers, colleted within hollow axles, and serving the aforesaid purposes, are described in U.S. Pat. No. 3,426,586. Measured weights, as represented by electrical signals from the various transducers, may be summed to characterize total craft weight, and may be used to calculate the locus of the center of gravity (c.g.) in accordance with the established principle that the horizontal distance to the c.g. from any selected transverse reference axis is equal to the sum of all moments of the measured weights about that axis divided by the total craft weight. When the aircraft is not at rest in a perfectly horizontal condition, the calculated position of center of gravity is inaccurate, the resulting error being a function both of the height of the c.g. above a horizontal plane of support and of the angle of fore-aft tilt or slope of that plane from the horizontal. The sloped condition is a common one, and, in the case of a craft oriented in a nose-down attitude, the c.g. appears to move forward, while, for a nose-high attitude, the shift in c.g. is rearward. This source of error is recognized in U.S. Pat. No. 2,540,807.

Typically, the error-inducing fore-aft slopes are relatively small, such as up to a normal maximum of ±6° from the horizontal; nevertheless, the attendant variations in c.g. position can be of serious magnitudes, and therefore related corrections can be highly important. Pendulous attitude sensors may serve the need for producing compensatory electrical signals related to slope angles, but sensitivity requirements generally dictate that the pendumum weight be relatively large, with the result that delicate supports can readily be damaged, as in the case of a weight suspended from a deformable element carrying strain-gages. In systems which incorporate such attitude sensors, the criticality of accurate c.g. measurements is such that the operativeness of the sensor at any time should be determinable. Yet, absenting foreknowledge that the craft is in fact tilted to a significant degree, a zero output from the sensor cannot be taken to signify that it is inoperative. One may provide accessory devices which will mechanically deflect the pendulous weight, for the purpose of checking its operation, but this involves cost, bulk and complexity which are preferably avoided.

SUMMARY

In accordance with one aspect of the present teachings, deviations of aircraft fore-aft pitch or slope are detected and characterized by a precision synchro-type inductor unit disposed with its axis of rotation transverse to the longitudinal axis of the craft and having its rotor aligned with the vertical by a relatively small pendulous cylindrical weight. A preferred embodiment involves relatively close confinement of the weight within a gasket-sealed container partially filled with a viscous damping fluid which is compatible with lubricant for the inductor unit located within the same container, and a simple rubber O-ring about the cylindrical weight provides yieldable bumper-stopping for the intended limits of pendulum deflections. The a-c excited primary winding carried by the synchro rotor is coupled about equally with two of three stator windings when the craft-mounted synchro stator is in a predetermined level orientation, and increases its coupling with one while decreasing its coupling with the other of these two windings when the craft pitches from the level in either angular direction, thereby signalling the magnitude and sense of slope. The third stator winding is in a close coupling with the primary throughout the permissible limited range of tilt, and its induced output is selectively connected to an external circuit through the other stator windings to characterize electrical-magnetic operativeness of the sensor system whenever that is called for. Presence of the latter output signifies both that the electrical excitation network and the synchro, including all its windings, are functioning correctly.

It is one of the objects of the present invention to provide novel and improved apparatus of low-cost, lightweight, uncomplicated and rugged construction which operates reliably and precisely to compensate for error-inducing fore-aft slope in aircraft c.g.-calculating equipment.

Another object is to provide a self-checking synchro-type attitude sensor for automatic correction of inaccuracies in aircraft c.g. measurements due to pitch effects.

Still further, it is an object to provide a unique slope-compensation inductor device, for aircraft c.g.-calculation systems, in which a pendulum-slaved rotor is disposed for inductive coupling with a self-checking stator winding at all times, the latter being selectively connectable through pitch-sensing windings to characterize operativeness of the inductor device and its electrical supply when the craft is in any attitude.

BRIEF DESCRIPTION OF THE DRAWINGS

Although the features of this invention which are considered to be novel are set forth in the appended claims, further details as to preferred practices and as to the further objects and features thereof may be most readily comprehended through reference to the following description of the preferred embodiment taken in connection with the accompanying drawings, wherein:

FIG. 2 presents a partly cross-sectioned view of a sealed synchro-type damped pendulous attitude sensor;

FIG. 4 is an exploded view of components of a preferred attitude sensor, such as that shown in FIG. 2, together with associated mounting provisions and an electronics circuit board for the network shown in FIG. 3.

DESCRIPTION OF THE PREFERRED EMBODIMENTS

Figure 1:
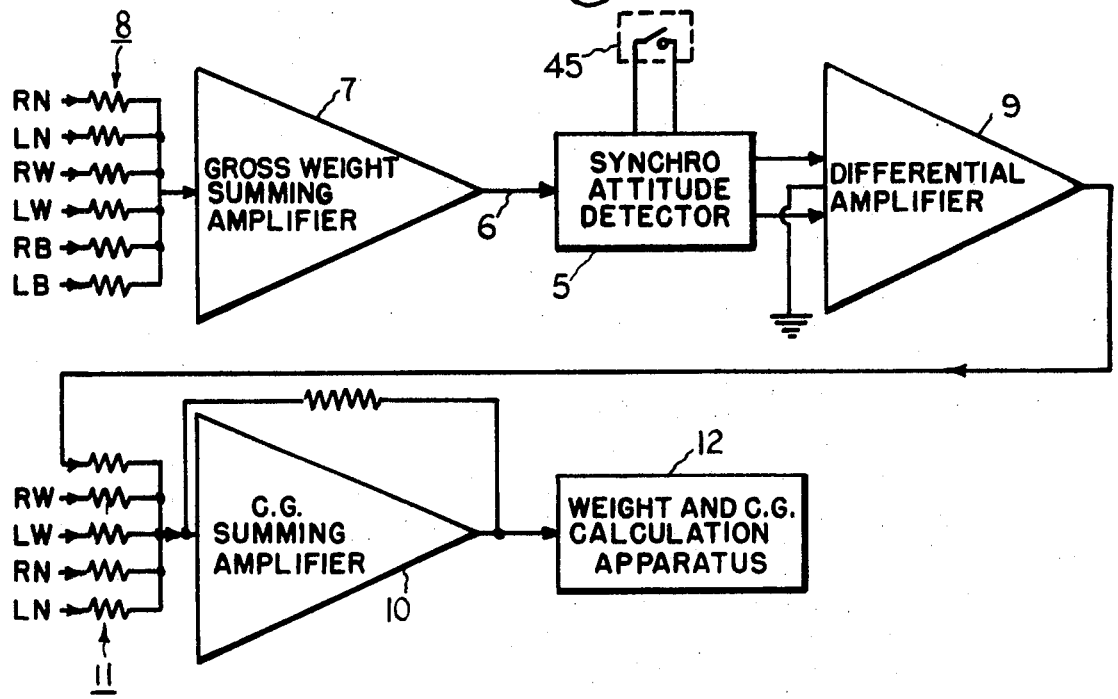
FIG. 1 is a partly schematic and partly block-diagrammed circuit including a self-checking synchro-type attitude sensor for accurate c.g. calculations aboard aircraft.

A typical system application involving the use of a slope-correction attitude detector, 5, is illustrated in FIG. 1, wherein that detector senses and electrically characterizes the longitudinal pitching or tilting of the aircraft in which it is installed. Inasmuch as the attitude detector may develop the needed correction as a function of gross weight of the craft, the detector is fed with a related electrical signal, via coupling 6, which is delivered from a gross weight summing amplifier 7. The latter amplifier responds to weight-related input signals applied to its summing network of resistances, 8, by on-board transducers associated with each of the different ground-support structures for the craft, such as struts and wheels having locations right of the nose (RN), left of the nose (LN), right wing (RW), left wing (LW), right body (RB), and left body (LB). As is discussed later herein, the attitude detector is in the preferred form of an assembly including an electrical synchro, and the aforesaid signal related to gross weight may be applied to its rotor winding. Outputs from the synchro attitude detector are processed through a differential amplifier 9 before being delivered to a c.g. summing amplifier 10 along with other weight signals from the on-board transducers, by way of summing network resistances 11. In turn, the latter summing amplifier output is applied to conventional weight and c.g. calculation apparatus, 12, which calculates and displays the craft weight and c.g. information in accordance with the principle noted hereinabove.

The partly cross-sectioned representation of an improved synchro-type attitude detector in FIG. 2 shows the compactly arrayed mechanical relationship of a known form of precision electrical synchro transmitter, 13, and a short generally cylindrical pendulum weight 14 underslung directly below it, the weight being affixed to one protruding end of the synchro rotor shaft 15 by an L-shaped pendulum shaft 16. The usual precision bearings (not shown) for the rotor of such a precision synchro insure that the weight will accurately align the rotor in predetermined relation to the vertical. A mounting plate 17, fixedly supported in relation to the aircraft, suspends the synchro and weight combination for the required limited freedom of angular movement about the synchro rotor axis 18—18, the latter being transverse to the longitudinal axis of the craft. Synchro 13 is represented schematically in FIG. 3, where the rotor shaft 15 is associated with and holds the primary or rotor winding 19 fixedly in relation to the vertical orientation established by the pendulum weight 14. The usual three symmetrically arrayed stator windings, 20, 21 and 22, are held fixedly in relation to the aircraft fuselage, and are disposed for inductive couplings with the primary. All of the synchro-pendulum combination is fashioned as a sealed unit, designated by dashed linework 23 in FIG. 3. In FIG. 2, that sealed unit is seen to include a cylindrical metal container 24, sealed with the upper flange portion 17a of mounting structure 17 by way of an elastomeric O-ring 25. Container 24 is sufficiently filled with a damping liquid, 26, for the pendulum weight 14 to be normally submerged in it and to have its excursions damped somewhat. Preferably, the liquid 26 is a silicone material, such as the DC 510/200CS fluid marketed by Dow-Corning; that fluid is compatible with bearing lubricant for a standard 115-volt size 10 synchro having a stainless steel casing, and complete immersion of synchro 13 does not detract significantly from its performance. It is likewise compatible with the material of sealing O-ring 25 and of a further elastomeric O-ring 27, which is fitted partly into a receiving groove 28 about the cylindrical exterior of pendulum weight 14. O-ring 27 is selected to protrude beyond the periphery of weight 14 and to function as a bumper stop in two directions, by making resilient engagements with the interior of container 24 when the relative angular displacements of the synchro rotor and stator from a mid position are about ± 10° as designated in FIG. 3.

The exploded view in FIG. 4 portrays the various components of the aforedescribed detector, together with associated conventional hardware items. In addition, the detector assembly there includes a top mounting plate 29, an external container 30 for the entire assembly, an internal connector and circuit board bracket 31, a cover mounting screw 32, and an electrical circuit board 33 which carries electrical components for the circuitry appearing in FIG. 3.

Figure 3:
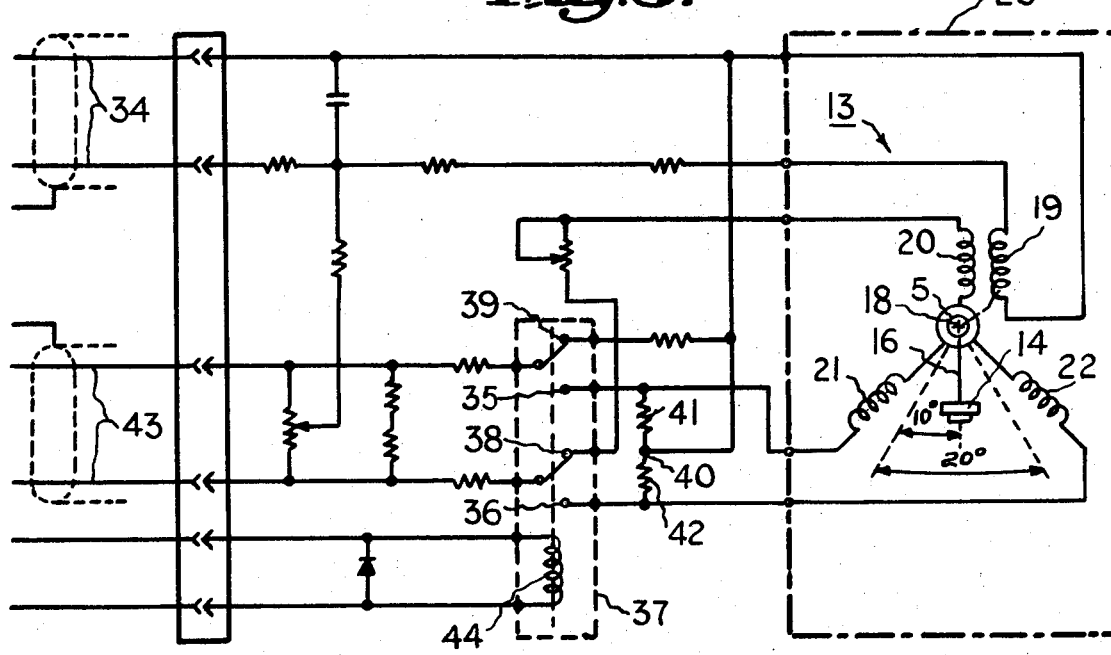
FIG. 3 provides a schematic wiring diagram for a network incorporating the improved self-checking attitude sensor.

Synchro primary rotor winding 19, in FIG. 3, is excited over lines 34 by a-c electrical signals related to gross weight, as has been mentioned above, and, for the condition when the craft is substantially level, the couplings between primary winding 19 and the two secondary stator windings 21 and 22 are substantially the same. Because these two stator windings are connected in series opposition, the net voltage appearing across the two associated contacts 35 and 36 of the electrical relay 37 is then substantially zero. However, under the same condition, a close coupling also exists between primary winding 19 and the third stator winding, 20, such that a relatively large voltage output from winding 20 will appear at relay contact 38, and may be measured in relation to a reference voltage level appearing at relay contact 39, the latter reference voltage being established by center-tapping at 40 between divider resistances 41 and 42 serially connected across the output terminals of the stator windings 21 and 22. Relay 37 is illustrated in a switching condition wherein the detector output, appearing on lines 43, will be that occasioned by the voltage across the third stator winding 20, although the state of electrical excitation of its relay coil, 44, may be selectively altered to cause the output from the cooperating stator windings 21 and 22 to appear on the lines 43 instead. If the rotor and stator of synchro 13 are angularly displaced, upon pitching of the plane in either direction from the horizontal, the coupling between the primary 19 and an appropriate one of the secondaries 21 and 22 increases, while it decreases with the other, such that a net output of distinctive magnitude and phase will appear between contacts 35 and 36 to characterize that condition; this output is in turn applied to leads 43 via relay 37, when the excitation state of its coil 44 so dictates. Leads 43 may provide input to amplifier 9 in FIG. 1, for example, and such input is of sense and magnitude to influence the operation of c.g. summing amplifier 10 in the manner necessary to cause the ultimate c.g. reading to be brought back to that which would obtain for the aircraft in a horizontal attitude. Because the synchro primary is excited by a signal related to gross weight, the resulting correction signal is readily caused to be proportional to the product of the sine of the aircraft slope angle, the gross weight, and the height of the aircraft centerline above ground.

Close coupling exists between the synchro primary 19 and the third stator winding 20, even when the rotor and stator are angularly displaced by a limited maximum such as ± 10°, and the attitude detector network will therefore remain capable of yielding output signal from winding 20 under any attitude condition, including the aforesaid level condition. Operation of a suitable "check" switch, 45 (FIG. 1), will cause the output from the "check" winding 20 to be delivered and to be employed as a reference or "check" concerning operativeness of the attitude detector; this switch is conveniently at a remote position such as that of the operator's control panel, and may control the excitation of relay coil 44. Importantly, one need not intentionally deflect the weight 14 to insure that a check output signal will be obtained. Further, when the output from the check winding 20 is referenced to voltages from the other two windings 21 and 22, as in the illustrated circuitry, that output characterizes and tests not only the operativeness of the primary winding 19 and its associated excitation provisions but, also, the conditions of both of the stator sensing windings 21 and 22. That is, failure or improper operation of either or both of the windings 21 and 22 will result in distinctive output conditions.

In other constructions, the stator windings 21 and 22 may be functionally duplicated by only a single winding. Similarly, the relay 37 may be replaced by other switching provisions, such as a manually operated switch. The improved detector may of course be used in any application requiring a signal proportional to attitude, particularly where self-checking is desired and where clamping and intentional deflections are to be avoided. Accordingly, it should be understood that the specific preferred embodiment and practices described herein have been presented by way of disclosure rather than limitation, and that those skilled in the art may effect various modifications, combinations and substitutions without departure from the spirit and scope of this invention in its broader aspects and as set forth in the accompanying claims.

What we claim as new and desire to secure by Letters Patent of the United States is:

1. Attitude-sensing apparatus comprising an electrical inductive device having rotor and stator portions relatively movable angularly about an axis, a support, bearings mounting said portions in relation to said support for relative angular movements about said axis, each of said rotor and stator portions including electrical winding means disposed for inductive coupling with the winding means of the other of said portions, means for electrically exciting the winding means of said rotor portion with periodically varying electrical signals, pendulous means slaving the angular orientation of said rotor portion in relation to the vertical, at least some of said winding means of said stator portion being fixed in relation to said support and disposed to develop substantially a zero net electrical output signal when in a predetermined angular relation to said rotor portion and to develop net electrical output signals of phase and magnitude characterizing the direction and extent of angular tilting movements of said support and winding means of said stator portion from said predetermined angular relation about said axis, mechanical stop means limiting to a relatively small angular range the relative angular movements between said stator and rotor portions, said range including said predetermined angular relation, and said winding means of said stator portion including a further winding disposed to have an electrical output signal induced therein by said winding means of said rotor portion when said rotor and stator portions are in any angular relation within said range about said axis, whereby said output signal from said further winding characterizes operativeness of said inductive device and electrically exciting means.

2. Attitude-sensing apparatus as set forth in claim 1 further including means connecting said output signal from said further winding for measurement through said winding means of said stator portion, whereby said output signal further characterizes operativeness of said winding means of said stator portion.

3. Attitude-sensing apparatus as set forth in claim 2 wherein said winding means of said stator portion comprises a pair of windings connected in series and disposed to have electrical signals of opposite polarities induced simultaneously therein by said winding means of said rotor portion, and wherein said net electrical output signals are developed across the series combination of said pair of windings.

4. Attitude-sensing apparatus as set forth in claim 3 further including voltage divider means connected across said series combination, and wherein said output signal from said further winding is measured through said connecting means between an end of said further winding and a tap on said voltage divider means.

5. Attitude-sensing apparatus as set forth in claim 4 wherein said inductive device comprises a synchro, wherein said pair of windings and said further winding are Y-connected, wherein said means for electrically exciting said winding means of said rotor portion comprises means exciting the said winding means with electrical signals characterizing the gross weight of an aircraft, and means mounting said support on the aircraft in position to orient said axis of said synchro substantially transversely to the longitudinal axis of the aircraft, and means for selectively switching the output from said apparatus from across said series combination to across said end of said further winding and said tap, whereby said output from across said series combination characterizes angular pitch of the aircraft and a function of the gross weight, and said output from across said end of said further winding and said tap characterizes operativeness of said apparatus, including all of said winding means and said electrically exciting means.

* * * * *